(12) United States Patent
Noonan et al.

(10) Patent No.: US 7,785,057 B2
(45) Date of Patent: Aug. 31, 2010

(54) GRAPPLE ATTACHMENT FOR HANDLING WRAPPED ROUND MODULES AND INCLUDING A WRAP CUTTER

(75) Inventors: James Thomas Noonan, Bondurant, IA (US); Jacob Edward Ervin, Urbandale, IA (US)

(73) Assignee: Deere & Company, Moline, IL (US)

( * ) Notice: Subject to any disclaimer, the term of this patent is extended or adjusted under 35 U.S.C. 154(b) by 436 days.

(21) Appl. No.: 11/927,967

(22) Filed: Oct. 30, 2007

(65) Prior Publication Data

US 2009/0108606 A1    Apr. 30, 2009

(51) Int. Cl.
*B65B 69/00* (2006.01)
(52) U.S. Cl. .......................................... 414/412; 83/924
(58) Field of Classification Search ................. 414/24.5, 414/412, 729, 739, 740; 294/88, 103.1, 104, 294/106, 107; 53/381.2; 83/648, 923, 924
See application file for complete search history.

(56) References Cited

U.S. PATENT DOCUMENTS

| | | | | |
|---|---|---|---|---|
| 4,382,625 A | * | 5/1983 | LaBounty | 294/104 |
| 4,597,703 A | * | 7/1986 | Bartolini | 414/24.5 |
| 5,033,683 A | * | 7/1991 | Taylor | 241/101.2 |
| 5,071,079 A | * | 12/1991 | Fykse et al. | 241/186.4 |
| 6,263,650 B1 | | 6/2001 | Deutsch et al. | |
| 6,263,774 B1 | * | 7/2001 | Rogness et al. | 83/578 |
| 2003/0019345 A1 | * | 1/2003 | Platon et al. | 83/924 |
| 2007/0130808 A1 | * | 6/2007 | Peterson et al. | 37/406 |
| 2007/0181469 A1 | * | 8/2007 | Stover | 209/552 |

FOREIGN PATENT DOCUMENTS

WO    WO-2006118469    * 11/2006

* cited by examiner

*Primary Examiner*—Stephen Choi

(57) ABSTRACT

A grapple attachment is equipped with driven rollers for selectively turning a wrapped round module about its axis so as to position it for having the wrapping slit at the bottom side of the module. When the module is properly located for having the wrapping slit, a powered cutting blade is caused to move into engagement with the wrapping and slit it across the length of the module. An interlock is provided for preventing operation of the grapple cylinders and driven roller motors unless the cutting blade assembly is located in a standby position wherein it is removed from a zone normally occupied by the round module when the latter is supported by the fixed and moveable grapple sections of the grapple attachment.

10 Claims, 8 Drawing Sheets

GRAPPLE ATTACHMENT FOR HANDLING WRAPPED ROUND MODULES AND INCLUDING A WRAP CUTTER

FIELD OF THE INVENTION

The present invention relates to bale or module handling devices, and more particularly relates to cotton module handling devices capable of placing the modules in a predetermined orientation about their longitudinal axes which is desirable when removing a protective wrapping of plastic sheet material from the modules for releasing the contained cotton on a cotton feeder floor at a cotton gin.

BACKGROUND OF THE INVENTION

A recent development in the harvesting of seed cotton has been to incorporate a module former and module wrapping apparatus in the seed cotton boll harvesting machine, with the module former and module wrapping apparatus forming cotton collected from the bolls into a large cylindrical module or bale and wrapping the module with a sheet of plastic wrapping material, for example, before the cotton module is ejected onto the ground. These modules are grouped or staged in the field, generally in end-to-end relationship to each other and in a number (usually four or more) equal to that required for loading a given transport truck or trailer used to transport the modules to the cotton gin. U.S. Pat. No. 6,263,650, granted 24 July 24, discloses a cotton harvester equipped with such a module former and module wrapping apparatus.

Once at the gin, it is necessary to remove the wrapping material from the module. A low cost means for removing the plastic wrapping material from the module is desired as part of processing the module on the feeder floor of the gin. While large gins may opt for a somewhat expensive automated means for removing the plastic wrap from the modules, in the case of smaller gins, there is a need for a lower cost means. While the plastic wrap may be slit manually using a utility knife mounted to a long wooden pole, cutting the wrap across the entire length of the module is cumbersome and requires positioning on both sides of the module to fully cut the wrap.

Accordingly, the problem to be solved is to maximize the operation of wrap removal together with handling the wrapped module using a loader attachment, and to have at least the step of slitting the plastic wrap located on the module to be controlled by the operator while seated in the loader.

SUMMARY OF THE INVENTION

According to the present invention, there is provided a wrapped round module handling attachment for a loader which incorporates a cutter for slitting the wrap to permit its removal from the module.

An object of the invention is to provide a cutter, of the type indicated above, which is controlled by an operator seated in the loader.

This object is achieved by providing a module grapple attachment having powered rollers for properly positioning the module about its axis for having its wrapper cut and into which is incorporated a cutter arrangement including a blade extending the width of the grapple attachment and coupled to a rockshaft so as to be selectively rocked by a powered actuator, with the blade being located so as to split the tensioned wrap slightly behind a powered roller mounted within the base of the grapple attachment. An interlock is provided for preventing rotation of the module if the blade is not in a fully retracted position clear of the grapple supported module.

This and other objects will become apparent from a reading of the ensuing description together with the appended drawings.

DESCRIPTION OF THE PREFERRED EMBODIMENT

Figure 1:
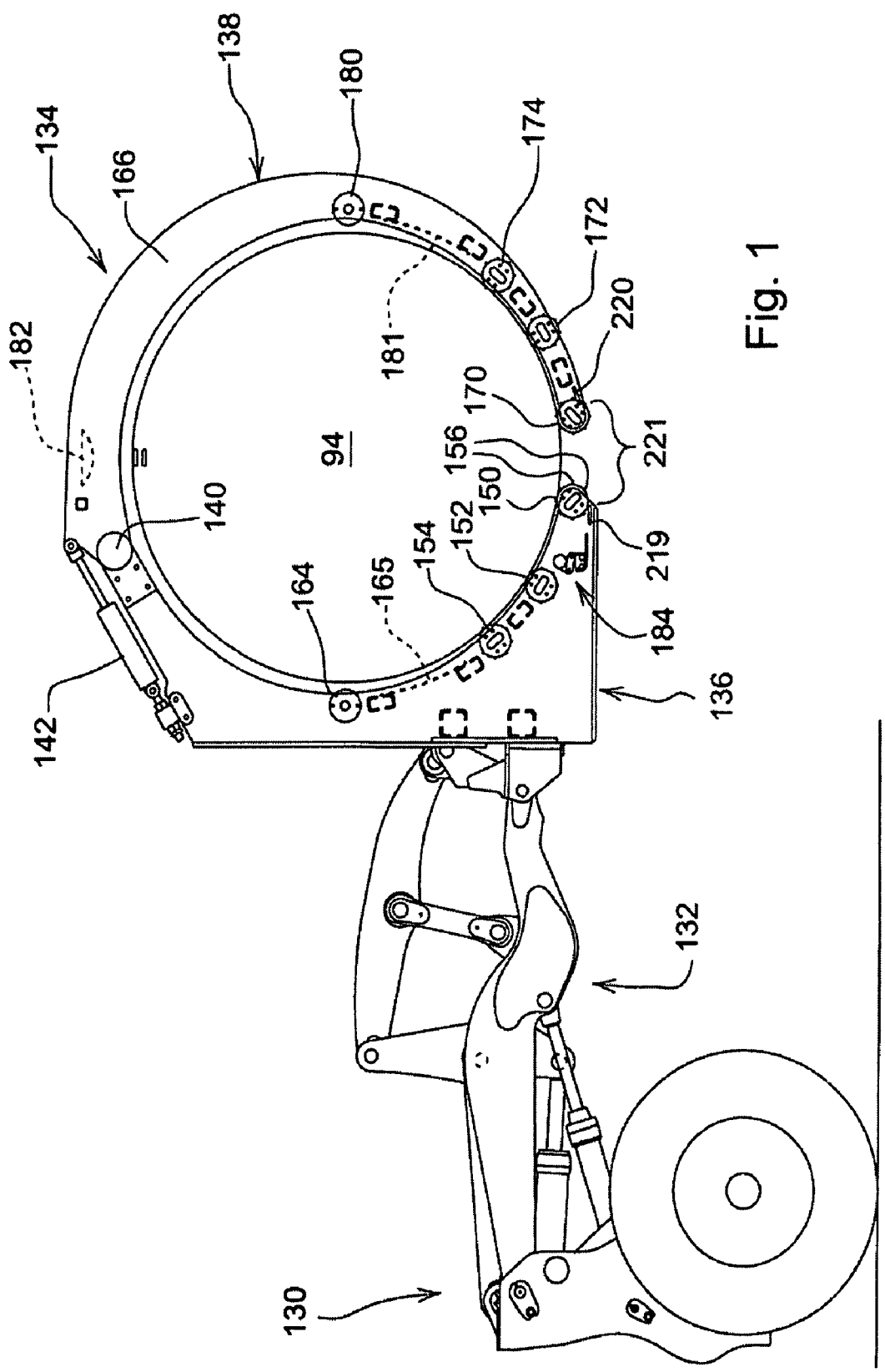
FIG. 1 is a right side view of a forward section of a front end loader supporting a grapple attachment specially designed for handling cylindrical cotton modules wrapped in plastic wrapping material.

Referring now to FIG. 1, there is shown a forward section of an articulated, front end loader 130 having a loader arm assembly 132 to which a grapple attachment 134 is coupled. It is to be noted that, instead of being mounted to a loader, the grapple attachment 134 could just as well be attached to a tractor equipped with a three-point hitch by providing the attachment 134 with an appropriate attaching plate.

Figure 2:
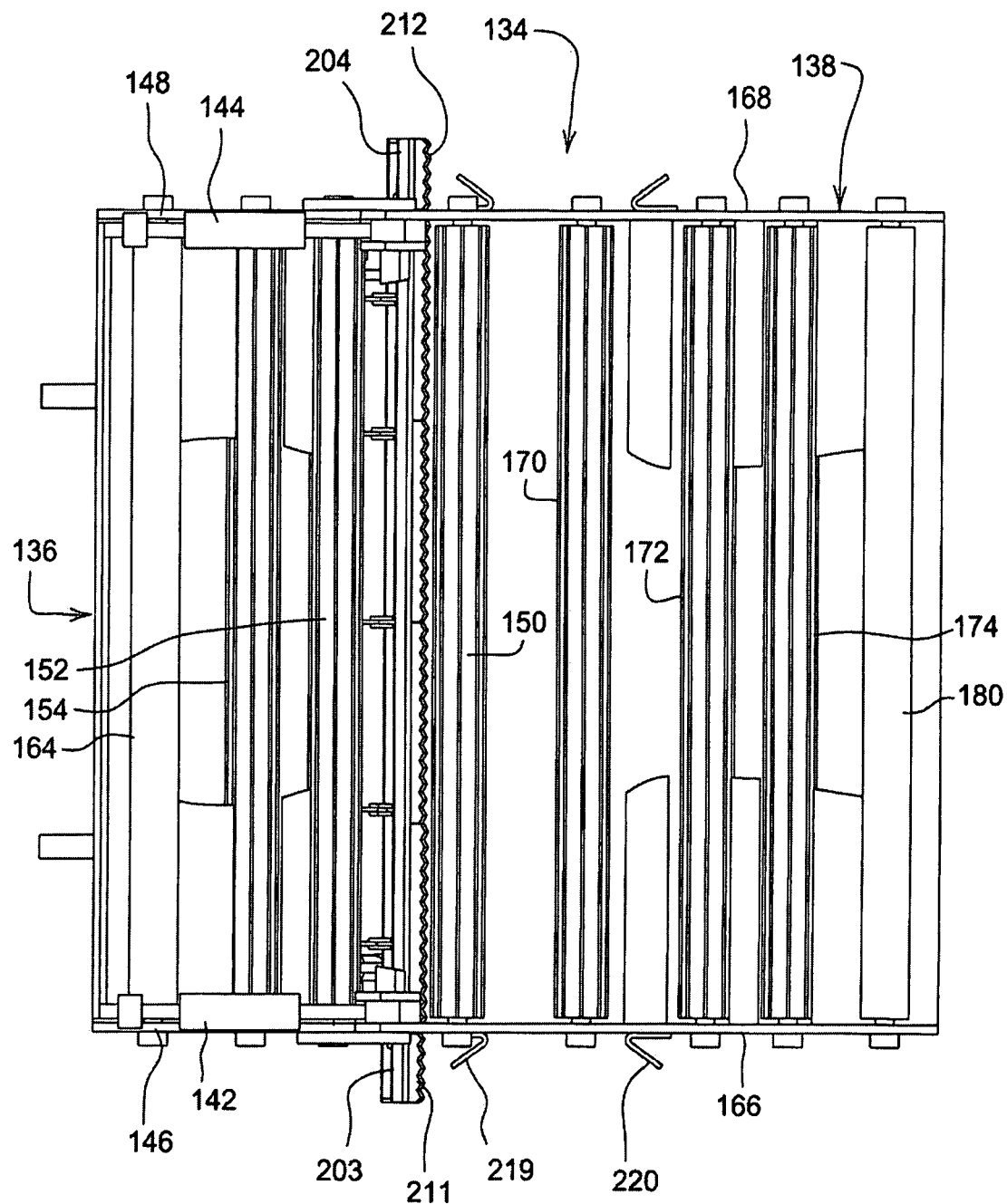
FIG. 2 is a top view of the grapple attachment shown in FIG. 1.

Referring also to FIG. 2, it can be seen that the grapple attachment 134 includes a forwardly curved (C-shaped), fixed or base grapple section 136, to an upper forward end of which an upper rearward end of a rearwardly curved (reverse C-shaped) movable grapple section 138 is pivotally coupled, as at a pivot assembly 140, which defines a horizontal axis about which the grapple section 138 swings vertically between a lowered closed position, as shown, and a raised open position. A pair of extensible and retractable hydraulic grapple cylinders 142 and 144 are coupled between the fixed and movable grapple sections 136 and 138, respectively, for selectively pivoting the movable grapple section 138 between its open and closed positions.

The fixed grapple section 136 includes a pair of transversely spaced side plates 146 and 148. Extending between, and having opposite ends rotatably mounted in, the side plates 146 and 148 are identical first, second and third powered rollers 150, 152 and 154, respectively, which are spaced one from another and are located in a lower front region of the fixed grapple section 136, with the first roller 150 being forward of the other two rollers. Provided at equally spaced locations about a circumference of each of the powered rollers 150, 152 and 154 are a plurality of longitudinally extending rods 156 having a purpose explained below, First, second and third, reversible hydraulic motors 158, 160 and 162 (shown only in FIG. 7) are respectively coupled for driving the powered rollers 150, 152 and 154. A first idler roller 164 extends between, and has opposite ends rotatably mounted in, the side plates 146 and 148 at approximately a nine o'clock position, as viewed in FIG. 1. A filler plate 165, which may be made of expanded metal, for example, is mounted between the side plates 146 and 148 in the region between the powered roller 154 and idler roller 164.

Similarly, the movable grapple section 138 includes a pair of transversely spaced side plates 166 and 168. Extending between, and having opposite ends rotatably mounted in, the side plates 166 and 168 are identical fourth, fifth and sixth powered rollers 170, 172 and 174, respectively, which are spaced one from another along a lower rear region of the movable grapple section 138, with the fourth powered roller 170 being rearward of the fifth powered roller 172. These powered rollers are identical to the ones provided on the fixed grapple section 136. Fourth, fifth and sixth reversible hydraulic motors 175, 176 and 178, respectively, are coupled to the powered rollers 170, 172 and 174. A second idler roller 180 extends between, and has opposite ends rotatably mounted in the side plates 166 and 168 at approximately a three o'clock position, as viewed in FIG. 1. A filler plate 181, which is similar to the filler plate 165, extends transversely between, and has opposite ends fixed to the side plates 166 and 168 at respective regions located between the powered roller 174 and the idler roller 180.

As viewed in FIG. 1, it can be seen that the various powered rollers and the idler rollers are positioned so that a portion of their respective peripheries extends beyond inner edges of the side plates 146, 148, 166 and 168, so as to be in engagement with a given wrapped cotton module 94, which is encompassed by the fixed and movable grapple sections 136 and 138, respectively, so as to support the module 94 in a loaded position for rotational movement, free of the side plates, about a longitudinal axis of the module. An RFID reader 182 is supported at an upper location between the side plates 166 and 168 so as to be positioned for sensing an RFID tag assembly 112 (see FIGS. 8-10) that is attached to wrapping material wrapped about the module 94, when the tag assembly is positioned at the top of the module 94. The location of the tag assembly 112 on the wrapping material is chosen such as to indicate that an inner tail section 108 of the wrapping material is located at the top of the module 94 when sensed by the reader 182, this being the desired position of the tail section 108 for the removal of the module wrapping when removal is to be done by cutting a slit across a width of the wrapping at a bottom location of the module. In the event the RFID reader 182 does not read the RFID tag assembly 112, then the sets of powered rollers 150, 152, 154 and 170, 172, 174 are appropriately driven to cause the module 94 to rotate until the reader 182 senses the RFID tag assembly 112.

When at the cotton gin, the wrapped module 94 is maneuvered into position over the conveying floor of the cotton gin. Once module is properly oriented with the RFID tag assembly 112 at the top, as indicated by the reader 182, the bottom surface of the wrapping may be slit lengthwise of the module, thereby permitting the cotton to flow through the slit.

Figure 3:
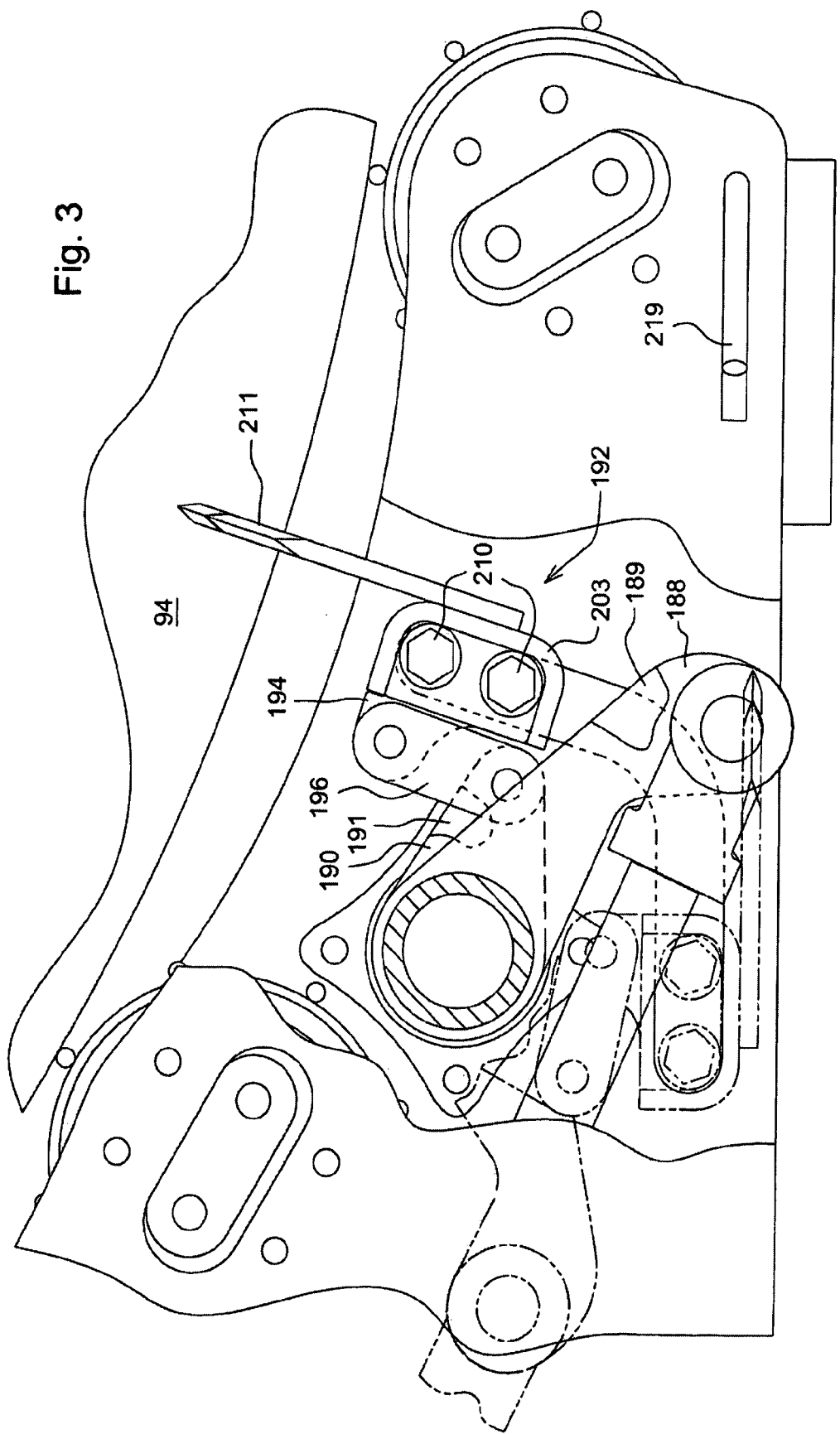
FIG. 3 is a an enlarged view of a lower right front region of the fixed, rear section of the grapple attachment shown in FIG. 1, with the cutting blade shown in solid lines in a cutting position and in dashed lines in a retracted position.
Figure 4:
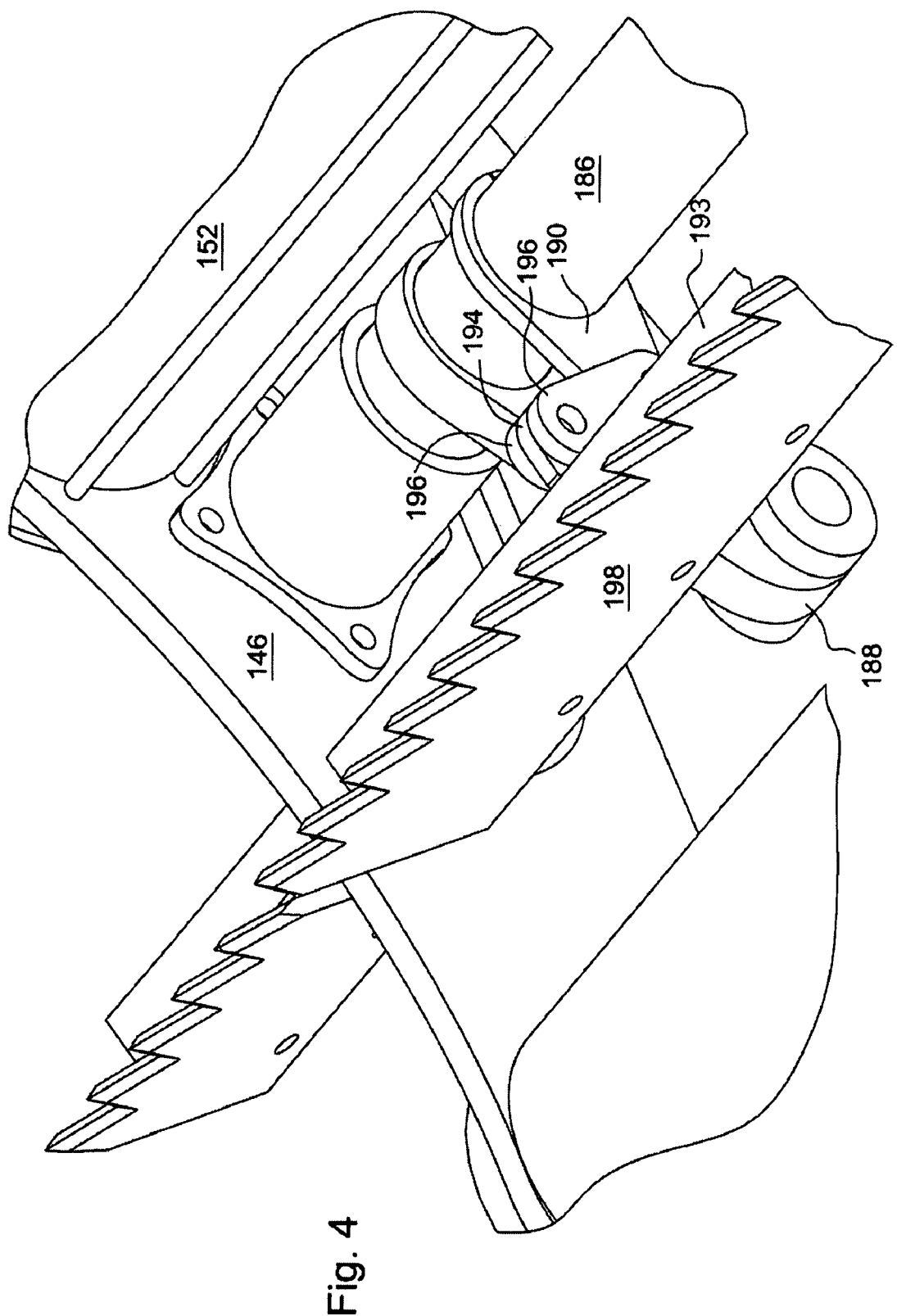
FIG. 4 is a perspective view showing the connection of the cutter blade assembly with the rockshaft.
Figure 5:
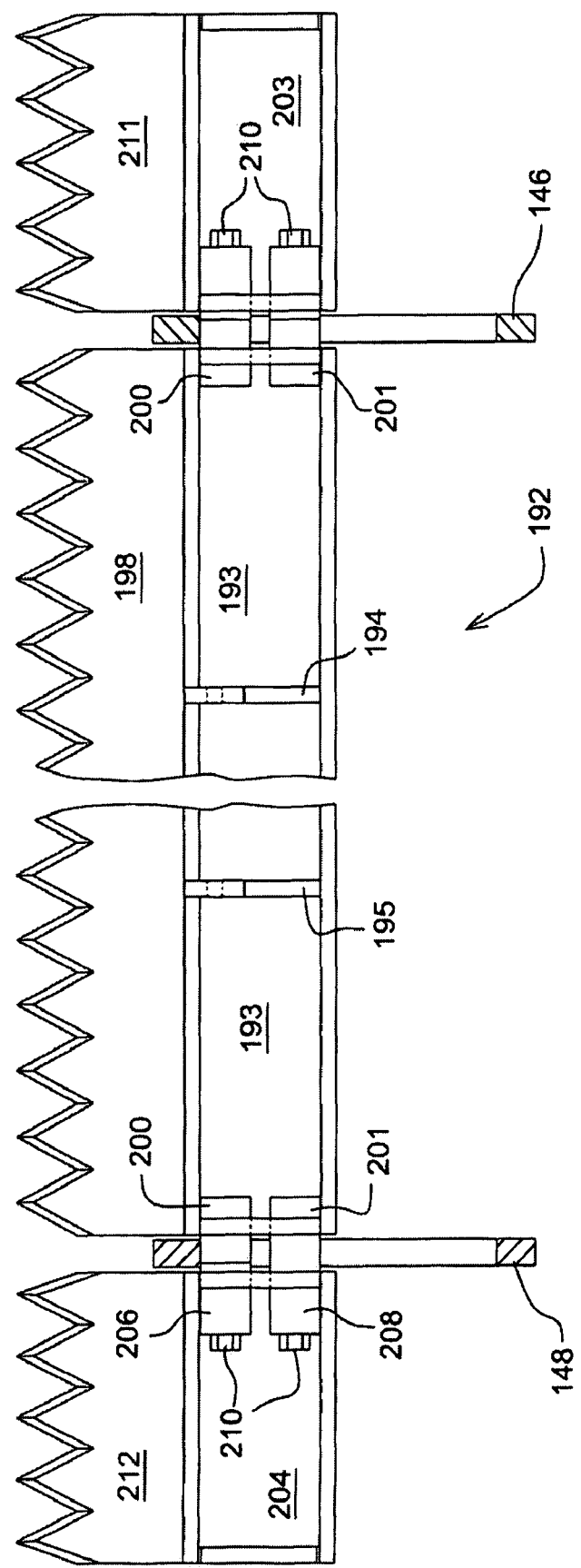
FIG. 5 is a sectional view taken along line 5-5 of FIG. 3.

Referring now to FIGS. 3, 4 and 5, there is shown a wrapping cutter mechanism 184, which is provided for the purpose of slitting the wrapping of the wrapped module 94. The wrapping cutter mechanism 184 is located between, and extends parallel to, the first and second powered rollers 150 and 152. The cutter mechanism 184 is in the form of a blade cutter and includes a rockshaft 186 extending horizontally between, and having opposite ends supported for rotation by the side plates 146 and 148 at a location below, and slightly forwardly of, the second powered roller 152. As considered in the solid line position shown in FIG. 3, right and left arms 188 and 189 are fixed to, and project forwardly and downwardly from each of opposite end regions of the rockshaft 186. Respectively fixed to the rockshaft 186 just inwardly of the arms 188 and 189 are right and left crank arms 190 and 191.

A cutter blade assembly 192 includes a transversely extending, blade support arrangement including a central blade support member 193 in the form of a U-shaped channel which opens toward the rear, as viewed in FIG. 3. Fixed within the channel so as to be respectively in fore-and-aft alignment with the crank arms 190 and 191 are mounting brackets 194 and 195, which define rearwardly projecting mounting ears that are respectively linked to the crank arms 190 and 191 by right and left sets of double links, with only the right double line 196 being shown. The cutter blade assembly 192 further includes a cutter blade arrangement extending substantially parallel to the horizontal pivot axis established by the pivot assembly 140, the cutter blade arrangement including a central cutter blade 198 fixed, as by welding, to the forward side of the central blade support member 193 and having a serrated cutting edge. As best seen in FIG. 5, fixed within each of opposite end regions of the channel shaped blade support member 193 are a pair of horizontal, upper and lower support rods 200 and 201, respectively, which project through respective slots provided in the side plates 146 and 148, the slots having generally the shape of a right angle with the respective legs being substantially vertical and horizontal and joined at a radius, of which only a slot 202 provided in the side plate 148 is shown. Each of the support rods 200 and 201 is internally threaded. Right and left, short blade support member extensions 203 and 204, respectively, are located on opposite sides of the side plates 146 and 148 from, and in alignment with, opposite ends of the central blade support member 193, with each of the extensions 203 and 204 having upper and lower tubular cylindrical receptacles 206 and 208 fixed thereto in alignment with the upper and lower support rods 200 and 201. Cap screws 210 are inserted through each receptacle 206 and 208 and are threaded into aligned ones of the internally threaded rods 300 and 201. Fixed, as by welding, to forward sides of the blade support member extensions 202 and 204 are right and left cutter blade extensions 211 and 212, respectively, which also have serrated cutting edges. Instead of the central cutter blade 198 and blade extensions 211 and 212 being welded to their respective supports, they could instead be coupled so as to be removable by using fasteners such as carriage bolts, for example. The use of the carriage bolts has the advantage that, because their heads are countersunk, cotton does not become snagged on the heads.

Right and left, extensible and retractable, cutter blade control hydraulic actuators 217 and 218 (see FIG. 7) respectively have their cylinder ends coupled to support structure close to the side plates 146 and 148 of the fixed grapple section 136 and have their rod ends respectively pivotally coupled to free ends of the arms 188 and 189. The actuators 217 and 218 are here shown as extensible and retractable hydraulic cylinders, which, when extended, place the central cutter blade 198 and blade extensions 211 and 212 in a substantially vertical, wrapper cutting position, as shown in solid lines in FIG. 3, wherein the serrated cutting edges extend above the periphery of the supported wrapped module 94 and penetrate the tensioned wrapping so as to create a slit in the wrapping extending approximately the full width of the module 94. When fully retracted, the actuators 217 and 218 rotate the arms 188 and 189 approximately 120° clockwise from their solid line position to the dashed line position, as shown in dashed lines in FIG. 3, wherein the central cutting blade 198 and the blade extensions 211 and 212 are withdrawn to a position below the rockshaft 186 wherein they are oriented in a substantially horizontal standby position.

Having a purpose explained in more detail below are a first pair of wrap hooks 219 respectively fixed one each to outer surfaces of the lower front regions of the side plates 146 and 148 of the fixed grapple section 136, and a second pair of wrap hooks 220 respectively fixed, one each, to outer surfaces of the lower rear regions of the side plates 166 and 168 of the moveable grapple section 138. Once the wrapping is cut, the moveable grapple section 138 is pivoted away from the fixed grapple section, causing the wrapping at the front of the slit to be pulled forwardly toward the grapple throat area 221 (see FIG. 1) defined between the powered rollers 154 and 174, respectively carried at the lower front of the fixed grapple section 136, and the lower rear of the moveable grapple section 138. A worker on the ground grasps the wrapper at the forward side of the slit and first manually engages it with the hook 220 at one side, and then with the hook 220 at the other side, of the moveable grapple section 138. The wrapper at the rearward side of the slit could likewise be engaged with the pair of hooks 219 carried by the fixed grapple section 136, but this is not entirely necessary. As described in more detail below, the gap between the front and rear edges of the plastic wrapping at the slit are separated from each other so as to permit cotton to exit through the widened slit by causing the rollers carried by the fixed grapple section 136 to be rotated counterclockwise and those carried by the moveable grapple section 134 to be driven clockwise.

Figure 6:
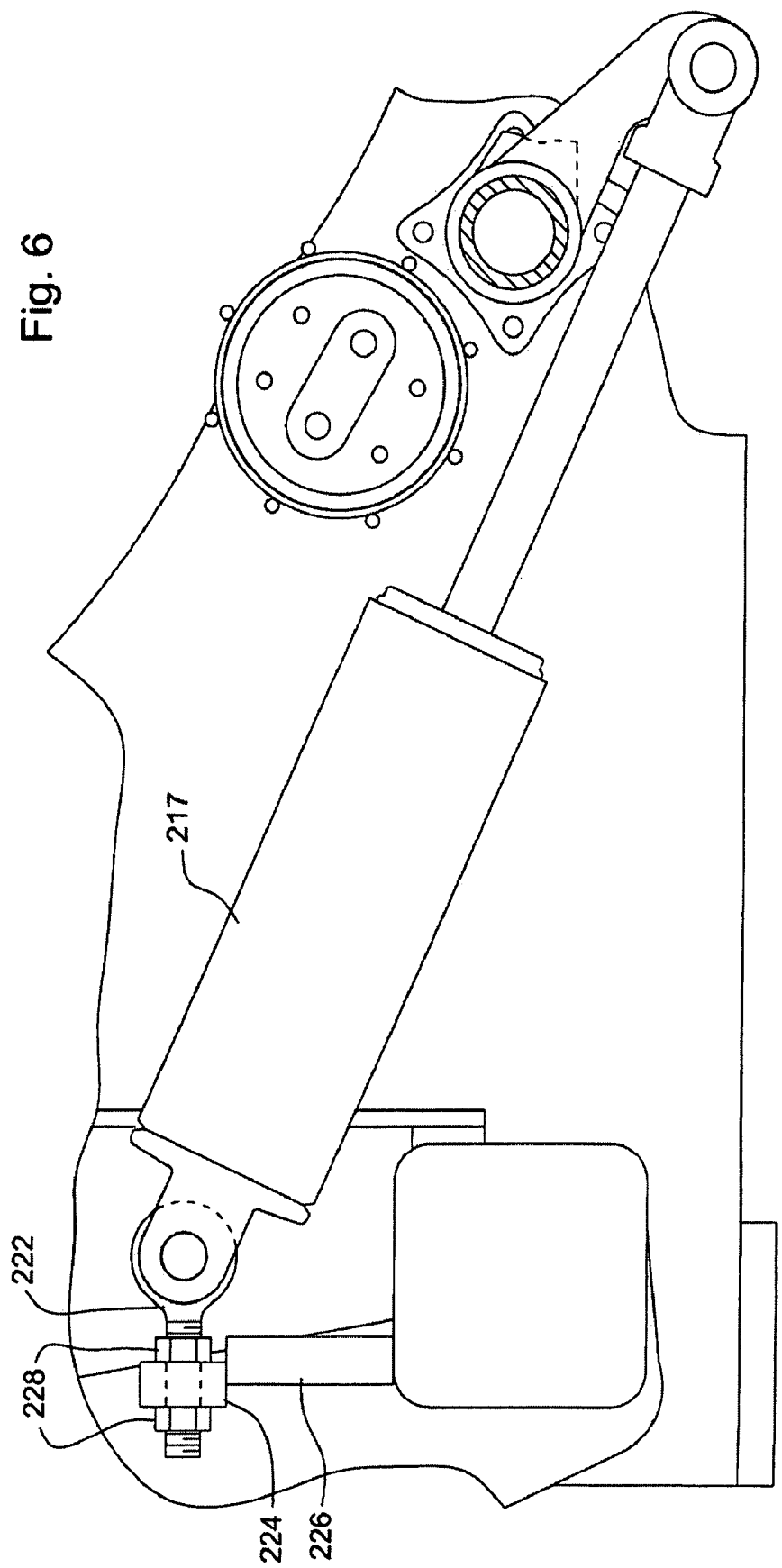
FIG. 6 is a view showing the adjustable connection for one of the cutting blade control actuators.

In order to ensure that the actuators 217 and 218 act to cause the serrated blade assembly 198, 211, 212 to completely sever the wrapping, the cylinder ends of the actuators are each mounted for adjustment along an extension of a longitudinal axis of the associated actuator so as to level the blade assembly relative to the surface of the module 94. Specifically, with reference to FIG. 6, it can be seen that the hydraulic actuator 217 is pivotally coupled to an eye of an eyebolt 222 having a threaded stem projecting rearwardly through a cylindrical tube 224 fixed to a support 226 forming part of the fixed grapple section 136. A pair of nuts 228 are received on the threaded stem, one at each end of the tube 224 so as to fix the effective length of the eyebolt 222. Accordingly, if a right end region of the serrated cutter blade assembly 198, 211, 212 is not penetrating far enough into the wrapping to cause it to be split, the eyebolt 222 may be adjusted forwardly. A reverse adjustment would be required if the cutting edge is exposed to the wrapping when the actuator 217 is retracted. A similar adjustable mounting (not shown) is provided for the hydraulic actuator 218, with it to be understood that it may similarly be adjusted as needed.

Figure 7:
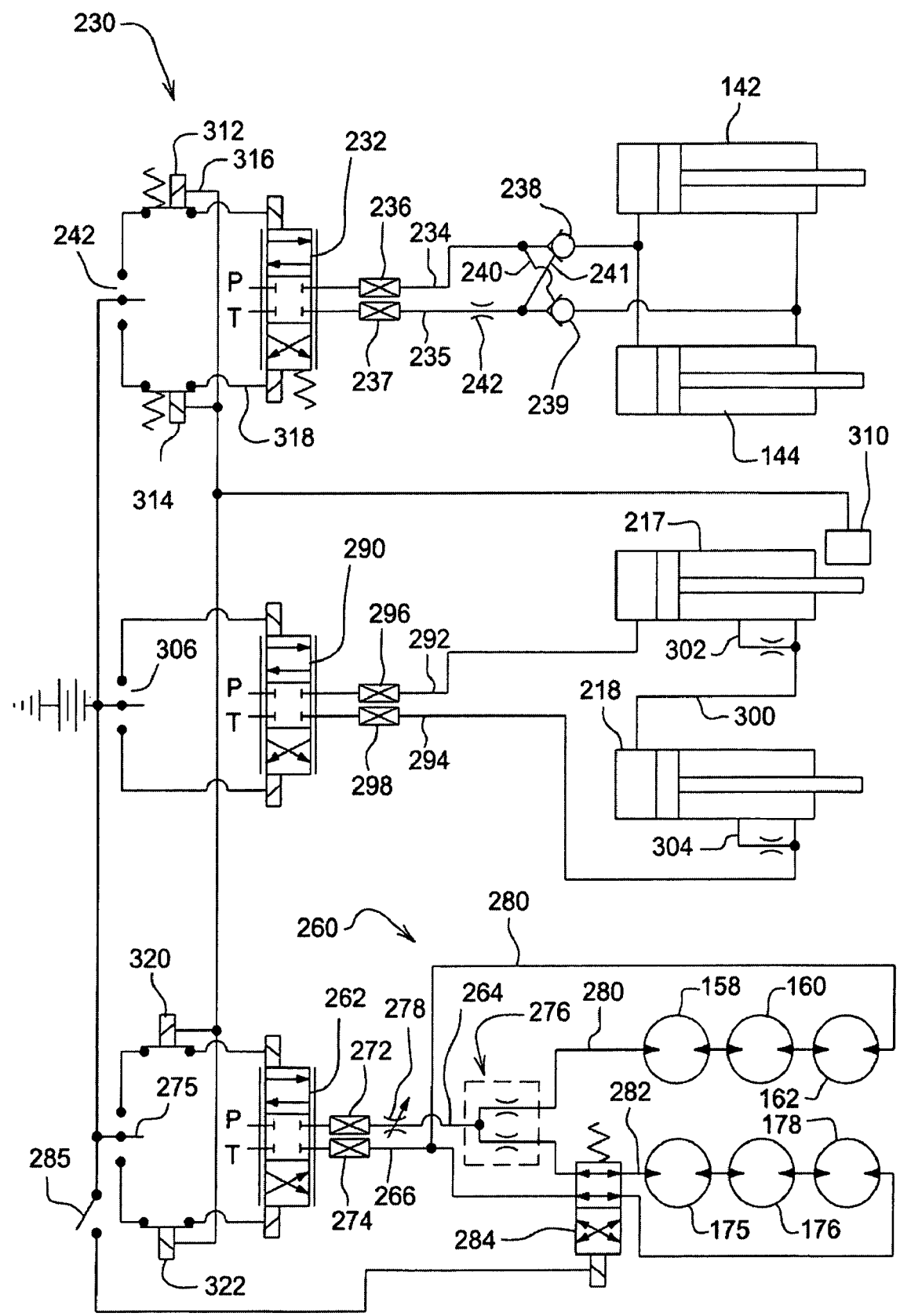
FIG. 7 is a schematic of the electro-hydraulic control circuit used for controlling the grapple actuators, the roller motors and the blade control actuators

Referring now to FIG. 7, there is shown a schematic representation of an electro-hydraulic control circuit 230 for controlling operation of the pair of grapple cylinders 142 and 144, the roller drive motors 158, 160, 162, 175, 176 and 178, and for controlling operation of the blade actuators 217 and 218.

Specifically, regarding the control of the grapple cylinders 142 and 144, it can be seen that a source of fluid pressure P, which may be a pump, and a tank or reservoir T are shown connected to a solenoid-operated, three-position, two-way servo control valve 232. These components are normally carried by the tractor. A set of pressure/return lines 234 and 235 are also connected to the servo control valve 232, with the connection being by quick couplers 236 and 237, respectively. The pressure/return line 234 is coupled to the head ends of each of the grapple cylinders 142 and 144, while the pressure/return line 235 is similarly coupled to the rod ends of each of the cylinders 142 and 144. A first check valve 238 is contained in the pressure/return line 234 upstream from the cylinder 142 and normally prevents flow in the direction of the control valve 232. Similarly, a second check valve 239 is contained in the pressure/return line 235 and normally prevents flow in the direction of the control valve 232. A first pilot control line 240 couples a location upstream from the check valve 238 with the seat of the check valve 239, while a second pilot control line 241 couples a location upstream from the check valve 237 with the seat of the check valve 236. A restrictor 242 is located between the check valve 237 and the control valve 232, the restrictor 242 acting to regulate the speed of operation of the grapple cylinders 142 and 144.

Shifting of the solenoid operated servo control valve 232 is actuated by a manually operable grapple control switch 242 here shown as a normally neutral toggle switch which, as viewed in FIG. 7, is moved downwardly so as to connect power to a solenoid at a lower end of the control valve 232, thereby coupling the pump P to the head ends of the grapple cylinders 142 and 144, and coupling the rod ends of the grapple cylinders 142 and 144 to the tank T, resulting in extension of the cylinders 142 and 144, and hence, closing of the moveable grapple section 138. Of course, movement of the control switch 242 upwardly from its neutral position will effect retraction of the grapple cylinders 142 and 144.

Referring now to the portion of the control circuit 230 relating to the control of the roller drive motors, it can be seen that there is provided a second solenoid-operated, three-position, two-way servo control valve 262 coupled on the one hand to the source of fluid pressure P and the tank T, and on the other hand to pressure/return lines 264 and 266, by way of quick couplers 272 and 274. Shifting of the servo control valve 262 to opposite sides of a normal neutral position, shown in FIG. 7, is a manually operated, motor control switch 275, here shown as a normally open toggle switch that is coupled to a source of power in parallel with the grapple control switch 242. The pressure/return line 264 is connected to a flow divider 276 and contains a variable restrictor 278 located upstream from the flow divider, for the purpose of controlling the speed of the hydraulic roller drive motors, as will be apparent. The flow divider 276 has first and second outlets respectively coupled to first and second branch lines 280 and 282. The first branch line 280 forms a loop which contains the set of series-connected hydraulic drive motors 158, 160 and 162 and has an end coupled to the pressure/return line 266 at a location between the servo control valve 262 and a solenoid-operated, two-position roller mode selector valve 284. The second branch line 282 contains the mode selector valve 284 and from there forms a loop which contains the set of series-connected hydraulic drive motors 175, 176 and 178, and has an end coupled back to an opposite side of the mode selector valve 284 from its connection with the pressure/return line 266.

The roller mode selector valve 284 is normally located in a module engaging/releasing/ginning mode, as shown, wherein, depending on the position of the servo control valve 262, the branch line 280 conveys fluid for driving the set of motors 158, 160 and 162 in first or second directions while the second branch line 282 simultaneously conveys pressure fluid to the set of motors 175, 176 and 178 so as to drive them respectively in a direction opposite to a direction in which the set of motors 158, 160 and 162 are being driven. Upon actuation, through the closing of a normally open, manually operated, mode selector switch 285, the mode selector valve 284 shifts upwardly to a cotton module rotation mode wherein in the branch line routes fluid to and from the set of motors 175, 176 and 178 for causing them to be driven in the same direction in which the set of motors 158, 160 and 162 are being driven, which, when a module 94 is supported by the sets of powered rollers 150, 152, 154, and 170, 172, 174 results in the module being rotated.

That portion of the electro-hydraulic circuit 230 for controlling the blade control cylinders 217 and 218 includes a third solenoid-operated, three-position, two-way servo control valve 290 coupled to the pump P and tank T and to first and second pressure/return lines 292 and 294, respectively, by quick-couplers 296 and 298. The pressure-return line 292 is coupled to the head end of the actuator 217. The actuator 218 is connected in series with the actuator 217, so as to follow its operation, by a connecting line 300 extending between the rod end of the actuator 217 and the head end of the actuator 218 and including a re-phasing groove 302 at its connection with the actuator 217. The pressure/return line 294 is connected to the rod end of the actuator 218 by a connection which includes a second re-phasing groove 304.

Provided for initiating operation of the cutter blade actuators 217 and 220 is a normally open cutter control switch 306 configured as a toggle switch having alternate contacts respectively coupled to solenoids at opposite ends of the valve 290. Assuming the cutter blade arrangement 198, 211, 212 to be in the retracted standby position shown in dashed lines in FIG. 3, the cutter blade arrangement can be moved to its extended cutting position, shown in solid lines by, manually moving the switch downwardly so as to connect power to the lower solenoid, which causes the valve 290 to shift downwardly and couple the source of pressure fluid P to the head end of the actuator 217 so as to cause the actuators 217 and 218 to extend causing the rockshaft 186 to be driven counterclockwise, with this motion being transferred to the blade assembly 192 so as to cause the serrated cutting edge of the blade arrangement to be thrust upwardly into the module 94, thus slitting the wrapping. The cutting blade arrangement 198, 211, 212 can be moved in the opposite direction, i.e., from its solid line cutting position in FIG. 3 to its dashed line standby position by moving the switch 306 upwardly from its neutral position in FIG. 7.

Provided for preventing operation of the grapple cylinders, or the roller drive motors when the cutting blade arrangement is possibly positioned with the serrated cutting edge in a region where it could come into contact with a module 94 supported within the grapple attachment 134 is an interlock comprising a proximity sensor 310 mounted to the fixed grapple section 136 in a location for sensing when the actuator 217 is fully retracted, this condition corresponding to the cutting blade arrangement being located in its withdrawn, standby position shown in dashed lines in FIG. 3. The proximity sensor 310 is coupled to a first pair of normally open, solenoid-operated switches 312 and 314 respectively located in leads 316 and 318 respectively coupled to opposite contacts of the grapple control switch 242 and to the upper and lower solenoids of the grapple servo control valve 232. The proximity sensor 310 is similarly coupled to a second pair of normally closed, solenoid-operated switches 320 and 322 respectively located in leads 324 and 326 respectively coupled to opposite contacts of the motor control switch 275 and the upper and lower solenoids of the motor servo control valve 262. Thus, whenever the actuator 217 is fully retracted, the proximity sensor 310 is energized and sends current for effecting actuation, and hence, closure of the normally open solenoid-operated switches 312 and 314 so as to permit actuation of the grapple servo control valve 232 by operation of the grapple control switch 242. Similarly, the energized proximity sensor 310 sends current for effecting actuation, and hence, closure of the normally open solenoid-operated switches 320 and 322 so as to permit actuation of the motor drive servo control valve 262 by operation of the motor control switch 275.

Figure 8:
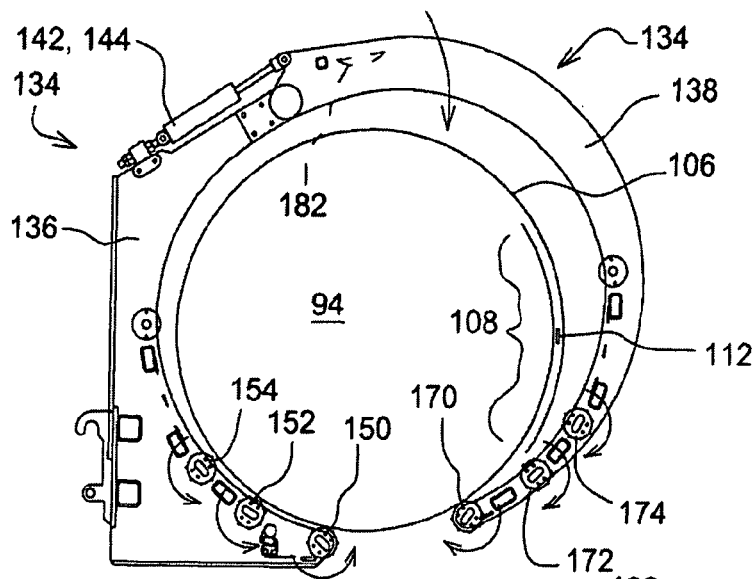
FIG. 8 is a right side view of the grapple and showing the moveable grapple section closing on a round module resting on the ground while the rollers are being driven for aiding the movement of the grapple beneath the module.

Specifically, referring now to FIG. 8, the grapple attachment 134 is schematically depicted during an operation for engaging a wrapped cotton module 94 resting on the ground in a field or on a trailer or truck bed at a cotton gin. Initially, the movable grapple section 138 is placed in its raised position by actuating the grapple cylinders 142 and 142 so that they retract, this operation being accomplished by actuating the grapple servo control valve 232 so that it shifts upwardly from its neutral position shown in FIG. 7. This operation is initiated by moving the grapple control switch 242 so as to energize the lead 316. It no actuation of the grapple actuators 142, 144 takes place, then this is an indication that the blade control actuators 217 and 218 are not fully retracted so as to ensure that the blade arrangement 198, 211, 212 is in its standby position so as to permit loading of a module 94 without its wrapper coming into contact with the blade arrangement. The blade actuators 217 and 218 are then caused to contract by manually switching the control switch 306 so as to power the upper solenoid of the blade servo control valve 290. Once retraction has taken place, the proximity switch 310 will energize the solenoid-operated switches 312 and 314 in the leads respectively provided for routing current to the grapple servo control valve 232 as dictated by the grapple actuator control switch 242.

Next, the motor control switch 275 is switched so as to cause the first set of hydraulic motors 158, 160 and 162, which are carried by the fixed grapple section 136, to be driven counterclockwise to aid movement of the rollers 150, 152 and 154 beneath, and into supporting relationship to the module 94 as the fixed grapple section 136 is moved against a left side region of the module 94. At the same time, the second set of hydraulic motors 175, 176 and 178, which are carried by the movable grapple section 138, are driven clockwise while the grapple section 138 is moved from its raised to a lowered position by extending the grapple actuators 142 and 144 through actuation of the servo control valve 232 by manually switching the grapple actuator control switch 242 so as to couple power to the lead 318. Of course, like the grapple actuators 142 and 144, no operation of the motors is permitted until the proximity sensor 310 has sent out a signal effecting closure of the solenoid-operated switches 320 and 322. This direction of rotation of the set of rollers 170, 172, and 174 together with the powering of the set of rollers 150, 152 and 154 resulting in the rollers being brought underneath the module 94. The combination of closing the movable grapple section 136 and powering the various rollers provides a means for lifting the module 94 while producing minimal damage to the wrapping. Also, no or very little rotation of the module 94 takes place since the opposite directions of rotation of the two sets of rollers imposes cancelling drive forces on the module 94.

Figure 9:
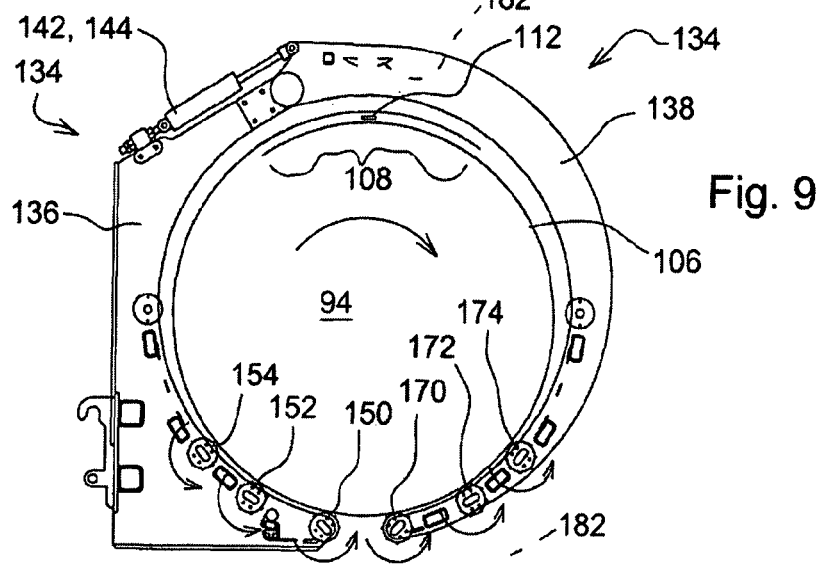
FIG. 9 is a right side view of the grapple shown closed and supporting a round module, with the rollers being driven for rotating the module so as to orient the module for having the wrapping slit at a bottom location of the module by placing a loose tail of the wrapping material at a top location of the module.

Referring now to FIG. 9, the grapple attachment 134 is schematically depicted during an operation for rotating the wrapped cotton module 94 for correctly positioning the loose inner tail section 108 of the wrapping material segment 106 for bringing the RFID tag assembly 112 into register with the RFID tag reader 182. This operation is accomplished by actuating both the servo control valve 262 and the roller mode selector valve 284, so that they shift upwardly from their respective neutral position and normal position shown in FIG. 7, thereby causing all of the roller drive motors 158, 160, 162, 175, 176 and 178, and the respective associated rollers 158, 160, 162, 175, 176 and 178 to rotate counter clockwise, which, in turn, causes the cotton module 94 to rotate clockwise. When the RFID tag assembly 112 passes beneath the RFID reader 182, a signal is generated which is transmitted to an operator who stops operation of the motors by deactivating the servo control valve 262 by permitting the switch 275 to return to its open position so that motor servo control valve 262 returns to its neutral position. The inner tail section 108 of the wrapper is then positioned at the top of the module 94, which is the appropriate position for having the wrapping opened by manually or mechanically slitting the wrapping at a location substantially diametrically opposite from the location of the RFID tag assembly 112.

With a grapple equipped with the mechanical wrapper cutting mechanism 194 the wrapper is then slit by effecting extension of the blade control actuators 217 and 218 so as to drive the blade arrangement 198, 211, 212 into its cutting position, shown in solid lines in FIG. 3. This operation is initiated by manually moving the blade actuator control switch 306 so as to couple power to the upper solenoid of the blade actuator servo control valve 290. Upon the serrated cutting edge of the blade arrangement 198, 211, 212 coming into engagement with the tensioned wrapper enveloping the circumference of the module 94, the wrapper will be slit substantially the full width of the module 94. The blade control actuators 217 and 218 are then once again caused to contract to move the blade arrangement 198, 211, 212 back to its standby position shown in dashed lines in FIG. 3. It is noted that during extension of the blade actuators 217 and 218, the proximity switch 310 became de-energized, but becomes energized once again upon the actuators 217 and 218 becoming retracted.

Figure 10:
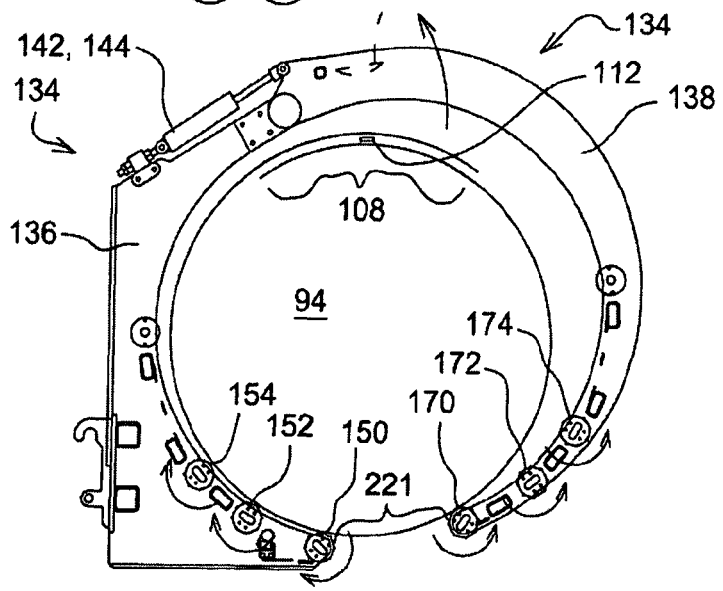
FIG. 10 is a right side view of the grapple shown opening subsequent to the wrapping on the round module being split, with the rollers being driven so as to aid in peeling the wrapping off the module.

Referring now to FIG. 10, the grapple attachment 134 is schematically depicted during an operation for removing the slit wrapping material for releasing the encased cotton so that the cotton falls upon a cotton gin conveyor floor, for example, over which the grapple attachment 134 has been positioned by operation of the front end loader 130. The removal of the slit wrapping material is accomplished by first actuating the grapple actuators 142 and 144 so that they begin to contract and lift the moveable grapple section 138. This action will result in the lower rear region of the moveable grapple arm exerting a force on the wrapper causing the wrapping at the forward side of the slit being moved forwardly and past the throat 221 between the fixed grapple section 136 and the moveable grapple section 138. A worker on the ground can then grasp the forward side of the wrapper and engage it first with one, and then with the other, of the wrap hooks 220 at the opposite sides of the moveable grapple section 138. The wrapper at the back side of the slit could likewise be hooked onto the wrap hooks 219, but this is not absolutely necessary. The first set of hydraulic motors 158, 160 and 162 are then operated to drive their associated rollers 150, 152 and 154 in the clockwise direction, while the motors 175, 176 and 178 are driven to drive their associated rollers 170, 172 and 176 in the counterclockwise direction, the respective directions of rotation being indicated by the arrows in FIG. 10. The movable grapple section 138 is simultaneously caused to open by retraction of the grapple cylinders 142 and 144, and with the rollers carried by the fixed grapple section 136 being driven clockwise and the rollers carried by the movable grapple section 138 being driven counterclockwise, the grapple sections are powered out from underneath the module, which aids in keeping the wrap attached to the hooks 220 and reduces the fracturing of the module 94 during the opening process. The net result is an unwrapped module that more closely holds its originally round shape. Keeping the round shape improves evenness of the feed rate into the gin.

The wrapping material is then conveniently located atop the deposited module 94 for manual removal or for mechanical removal by a vacuum device (not shown), such as that disclosed in the aforementioned U.S. Pat. No. 7,165,928, for example.

Having described the preferred embodiment, it will become apparent that various modifications can be made without departing from the scope of the invention as defined in the accompanying claims.

The invention claimed is:

1. In a grapple attachment for handling round modules covered in a wrapping including a fixed grapple section and a moveable grapple section having an upper rear region mounted to an upper front region of said fixed grapple section for pivotal movement about a horizontal axis between open and closed positions, and a first power actuator arrangement being coupled between said fixed and moveable grapple sections for selectively moving said moveable grapple section between said open and closed positions, the improvement comprising: a powered cutter including a cutter blade arrangement extending parallel to said axis and having a length commensurate with a length of a module adapted for being supported by said grapple attachment in a loaded position with a longitudinal axis of said module disposed parallel to said horizontal axis, with said cutter blade arrangement including a cutting edge and being mounted to said fixed grapple section for movement between a standby position, wherein said cutting edge is located outside a region occupied by said module when said module is supported by said grapple attachment in said loaded position, and a cutting position, wherein said cutting edge is directed substantially vertically relative to a tangent to a surface location of said module and located within said region occupied by said module when supported by said grapple attachment, and a second power actuator arrangement being coupled between said fixed grapple section and said cutter blade arrangement for selectively moving said cutter blade arrangement between said standby and cutting positions.

2. The grapple attachment, as defined in claim 1, wherein said cutter blade arrangement is mounted to a lower front region of said fixed grapple section.

3. The grapple attachment, as defined in claim 1, wherein said grapple attachment is equipped with a powered roller arrangement located for engaging said round module when supported by said grapple, and said powered roller arrangement including a third power actuator arrangement which is selectively actuated for driving said roller assembly to effect rotation of said module about said longitudinal axis of said module so as to orient said module to a preferred location relative to said cutter blade arrangement for having said wrapping slit.

4. The grapple attachment, as defined in claim 1, wherein said powered cutter includes a horizontal transverse rockshaft mounted to said fixed grapple section for rotation; at least one arm being fixed to said rockshaft; said second power actuator arrangement including at least one extensible and retractable blade actuator coupled between said fixed grapple section and said at least one arm; and linkage arrangement being coupled between said rockshaft and said cutter blade arrangement, with said at least one arm, linkage arrangement and at least one blade actuator being so constructed and oriented relative to each other that said blade arrangement is placed in said cutting position when said at least one actuator is extended, and is placed in said standby position when said at least one actuator is contracted.

5. The grapple attachment, as defined in claim 3, and further including an interlock arrangement including a sensor for sensing when said cutter blade arrangement is in said standby position and for sending a control signal for enabling operation of said first and third power actuator arrangements only when said cutter blade arrangement is positioned in said standby position.

6. The grapple attachment, as defined in claim 1, wherein said fixed grapple section includes opposite side plates spaced apart by a distance less than said length of said module; said cutter blade arrangement including a central blade section extending between said opposite side plates; right and left blade extensions respectively being located on opposite sides of said opposite side plates from said central blade section, and being in alignment with, and being releasably coupled to right and left ends of said central blade section by right and left fastener arrangements; and a clearance slot being provided in each of said opposite side plates and receiving an associated one of said right and left fastener arrangements.

7. The grapple attachment, as defined in claim 1, wherein said fixed grapple section includes opposite side plates, and further including a powered roller arrangement comprising a first roller extending horizontally between, and being rotatably mounted to lower front regions of said opposite side plates and a second roller extending horizontally between, and being rotatably mounted to said opposite side plates at regions spaced to the rear and above said first roller; and said cutter blade arrangement being located between said first and second rollers when in said cutting position.

8. The grapple attachment, as defined in claim 6, wherein said cutter blade arrangement includes a central blade support section configured as a U-shaped channel and having said central blade section fixed to web region thereof, and right and left blade support extensions, respectively, being configured similarly to said central blade support section and respectively having said right and left blade extensions fixed to web regions thereof; and said fastener arrangements including upper and lower, internally threaded rods located within, and fixed to each of opposite end regions of the channel defining said central blade support section, with said upper and lower rods extending outwardly beyond said the opposite ends of said central blade support section; and said right and left blade support sections each having upper and lower cylindrical receptacles aligned with adjacent ones of said upper and lower rods and secured thereto by upper and lower threaded fasteners; and said upper and lower rods at each end of said central blade support section being located in an adjacent one of the clearance slots.

9. The grapple attachment, as defined in claim 1, wherein said powered cutter includes a horizontal transverse rockshaft mounted to said fixed grapple section for rotation; first and second arms being fixed to said rockshaft respectively adjacent opposite end regions of said rockshaft; said second power actuator arrangement including first and second extensible and retractable blade actuators respectively coupled between said fixed grapple section and said first and second arms; a linkage arrangement including first and second linkages respectively coupled between opposite end regions of said rockshaft and said cutter blade arrangement, with said first and second arms, linkage arrangement and first and second blade actuators being so constructed and oriented relative to each other that said blade arrangement is placed in said cutting position when said at least one actuator is extended, and is placed in said standby position when said at least one actuator is contracted; and each of said first and second blade actuators having a connection arrangement coupling said first and second blade actuators to said fixed grapple section that is adjustable along a longitudinal axis of an associated one of the first and second blade actuators, whereby an adjustment may be made of one or another of said connection arrangements if necessary to level said cutting blade relative to the module being supported by the grapple.

10. The grapple attachment, as defined in claim 1, wherein said cutter blade arrangement includes a blade support member arrangement in the form of a U-shaped channel; and a cutter blade extending lengthwise of, and being fixed to a web region of, said blade support member.

* * * * *